United States Patent [19]

Jacobson

[11] 4,224,082
[45] Sep. 23, 1980

[54] MULTI-FUNCTIONAL SOLAR COLLECTOR POLE

[75] Inventor: J. Merritt Jacobson, Boynton Beach, Fla.

[73] Assignee: Independent Power Company, Inc., Palm Beach, Fla.

[21] Appl. No.: 52,209

[22] Filed: Jun. 26, 1979

[51] Int. Cl.$^2$ .......................... H01L 31/04; F24J 3/02
[52] U.S. Cl. .................................. 136/248; 126/432; 126/438; 126/443; 136/246
[58] Field of Search ........ 136/89 HY, 89 PC, 89 AC; 126/432, 437, 438, 443

[56] References Cited

U.S. PATENT DOCUMENTS

| | | | |
|---|---|---|---|
| 4,023,368 | 5/1977 | Kelly | 60/698 |
| 4,026,267 | 5/1977 | Coleman | 126/436 |
| 4,080,221 | 3/1978 | Manelas | 136/89 PC |
| 4,081,289 | 3/1978 | Campbell | 136/89 PC |
| 4,106,952 | 8/1978 | Kravitz | 136/89 HY |
| 4,137,097 | 1/1979 | Kelly | 136/89 PC |
| 4,137,098 | 1/1979 | Field | 136/89 PC |

OTHER PUBLICATIONS

E. C. Kern, Jr. et al, "Combined Photovoltaic & Thermal Hybrid Collector Systems", *Conf. Record, 13th IEEE Photovoltaic Specialists Conf.*, (1978), pp. 1153-1157.
D. G. Scheuler et al, "Integration of Photovoltaic & Solar-Thermal Energy Conversion Systems", *Conf. Record, 11th IEEE Photovoltaic Specialists Conf.*,(1975), pp. 327-331.
M. A. Duguay, "Solar Electricity: The Hybrid System Approach", *American Scientist*, vol. 65, pp. 422-427 (1977).
SES, Inc. Product Literature "Solar-Electric Conversion Panels—Application: Cathodic Protection", SES, Inc., Newark, Del. (1977).

*Primary Examiner*—Aaron Weisstuch
*Attorney, Agent, or Firm*—Cushman, Darby & Cushman

[57] ABSTRACT

A plurality of solar collectors including at least a solar energy to electrical energy transducer and a solar energy to heat transducer positioned on a single pole. The electrical energy transducer comprises a plurality of solar cells arranged with their faces parallel to the longitudinal axis of the pole and pointed in a plurality of directions. A reflector is positioned to the north of the pole and the cells which reflects sunlight to the northerly facing cells. The heat transducer comprises tubing helically arranged about the pole encased in a transparent ambient air screen. A reflector is attached to the north side of the ambient air screen. The wires from the solar cells and the pipes connected to the helical tubing run down through the center of the pole. A wind energy to electrical energy transducer may also be positioned at the top of the pole.

13 Claims, 6 Drawing Figures

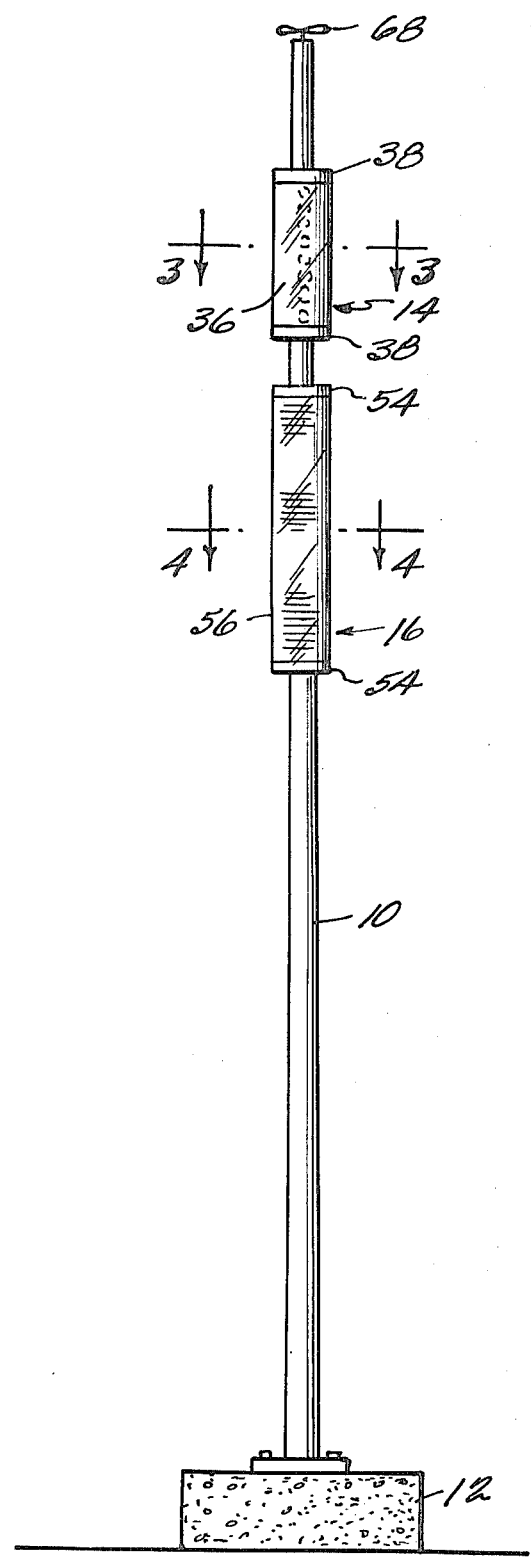
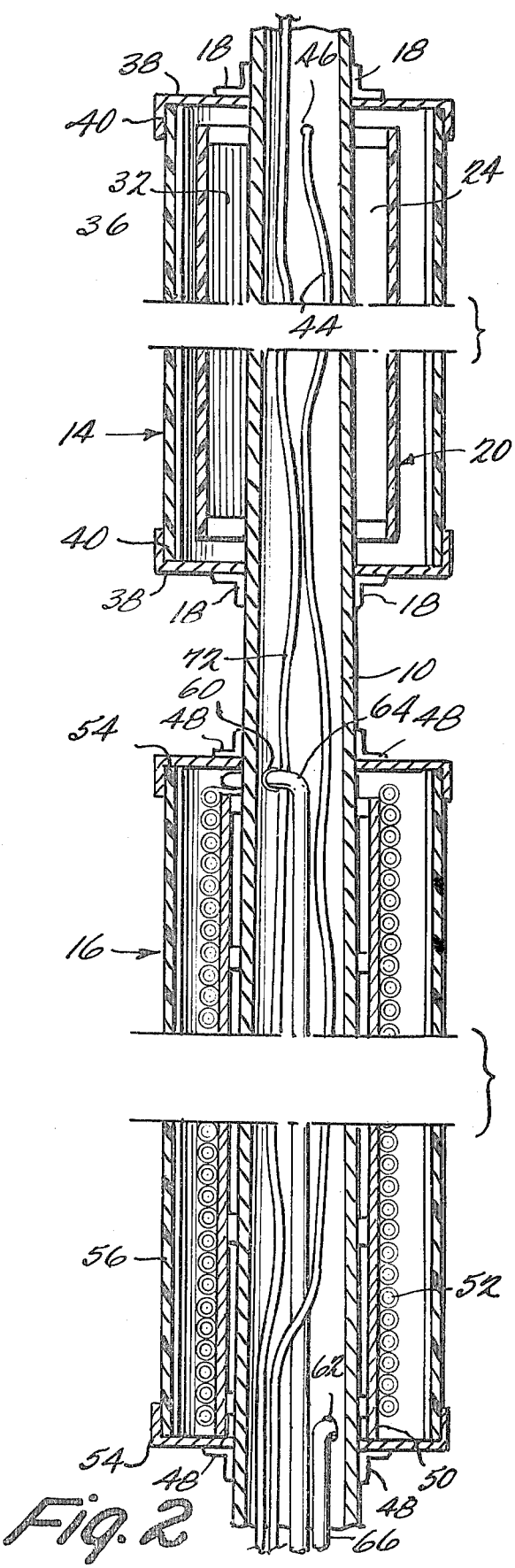

MULTI-FUNCTIONAL SOLAR COLLECTOR POLE

The present invention relates to solar collectors, and more particularly to the mounting of a plurality of solar collectors on a single pole.

As reserves of energy producing resources (coal, oil, uranium, etc.) dwindle around the world, it is becoming increasingly important to find alternative sources of energy. It is also important that the environment not be sacrificed in order to maintain a supply of usable fuel. It appears that an unacceptable trend has developed wherein environmental quality standards are being degraded to enable the use of environmentally undesirable fuels, (i.e., high sulfur coal or the use of lead substitutes to increase octane in "unleaded" gasoline).

Both oil and coal are limited resources in that reserves are indeed dwindling and will eventually run out. Although the supply of uranium is much greater than that of coal or oil (especially considering the amount of energy retrievable per unit weight of fuel) even the supply of uranium is decreasing.

The transformation of solar energy into other forms of energy has come under increased study and use as a solution to the problems raised by the use of conventional energy sources. Minimal environmental problems are associated with solar energy and the supply is limited only by the life of our sun.

Much progress has been made in the technology of converting solar energy into other forms of energy. U.S. Pat. No. 4,027,653 to Meckler discloses a solar energy collector wherein helically wrapped tubing is positioned within a transparent shield. Mirrors reflect solar energy passing through the shield and concentrate the same on the helical coil to heat fluid therein.

A helical arrangement of heat collectors is also taught by U.S. Pat. Nos. 3,853,114 to Gaydos and 4,086,911 to Futch. U.S. Pat. No. 3,958,553 to Brantley discloses a solar energy trap wherein helical tubing is positioned about a cylinder. Mirrors concentrate the light. However, the mirrors direct light up the center of the cylinder so that the major portion of the energy is absorbed by a collector at the opposite end.

U.S. Pat. No. 4,051,890 to Melchior teaches the use of a cylindrical, dome shaped cover through which solar energy passes and is trapped.

U.S. Pat. Nos. 4,002,158 to Radebold and 3,934,537 to Dandini teach the advantages of raising a solar collector system on a pole above the ground. In the Gaydos patent, supra, a heat absorber is positioned on the roof of a building to increase sun exposure.

In the present invention, a plurality of solar collectors including at least a solar energy to electrical energy transducer and a solar energy to heat transducer are positioned on a single pole. The electrical energy transducer comprises a plurality of solar cells arranged with their faces parallel to the longitudinal axis of the pole and pointed in a plurality of directions. In the United States, the sun will shine directly on the cells facing south and will not shine directly on the cells facing north. To increase the output of the electrical energy transducer, a reflector is positioned to the north of the pole and the cells, which reflects sunlight to the northerly facing cells.

The heat transducer comprises tubing helically arranged about the pole, encased in a transparent ambient air screen for maintaining an ambient air chamber. To intensify the amount of solar energy striking the helical tubing, a reflector is attached to the north side of the ambient air screen which directs sunlight to the northerly portion of the tubing.

The wires from the solar cells and the pipes connected to the helical tubing run down through the center of the pole. The electrical energy from the solar cells may be used to drive pumps for circulating water through the tubing, to charge a battery and provide electricity for any other desired purpose, such as lighting a home. Water in a hot water holding tank is heated as it passes through the helical tubing. Hot water, for example, for household purposes, may be drawn from the hot water holding tank.

The solar collector pole of the present invention provides many advantages over prior art solar devices. By incorporating a number of different types of solar collectors on a single pole, low grade solar energy may be more efficiently collected and utilized. The central core of the common pole provides a convenient means for conveying the produced energy to a location where they may be utilized. Furthermore, by consolidating a number of solar collectors on a single pole, the subject invention is aesthetically more appealing than if the solar collectors were mounted separately. Furthermore, the positioning of all the solar collectors on a single pole precludes the possibility of one solar collector shading other solar collectors.

Furthermore, the vertical arrangement of solar collectors on a pole seems to maximize the ratio of energy produced to ground area occupied. Prior art solar collectors, particularly solar cells, have been typically arranged in large planes perpendicular to the incidence of the sun's rays. Typically, these arrays of solar cells have been arranged on the roofs of buildings or mounted on poles. As the use of solar energy becomes more popular, it is easy to envision communities having skylines littered with unattractive arrays of solar collectors, reminiscent of the unsightly manner in which electrical wires were strung in our cities in the early part of this century. The cylindrical arrangement of the collectors in the present invention about the pole obviates this problem. The pole presents a slim, sleek profile which not only does not obstruct the view, but which is itself aesthetically pleasing. The present inventor has discovered that whatever energy may be lost by not positioning the solar collectors in a plane perpendicular to the sun's rays is compensated by the use of a helical or cylindrical arrangement about the pole with reflectors directing solar energy to the northerly side of the pole.

The present inventor has found it particularly advantageous to position the electrical energy transducer above the heat transducer. The amount of energy in the sun's rays just after sunrise and just before sunset is comparatively low. In fact, it is so low that very little heat will be transferred to the fluid within the tubing of the heat transducer. On the other hand, the energy in the sun's rays at these times (and even a bit before sunrise and after sunset) is sufficient to drive the solar cells. Furthermore, as the sun rises and sets, the top of the pole will be illuminated longer than the rest of the pole.

By positioning an electrical energy transducer and a heat transducer on the same pole, energy from the sun will be captured from before sunrise to after sunset. By positioning the electrical transducer above the heat transducer, the sun's energy will be most sufficiently utilized.

These and other objects and advantages of the invention will become more apparent and more readily appreciated from the following detailed description of the presently preferred exemplary embodiment of the invention taken in conjunction with the accompanying drawings, of which:

FIG. 1 is a side elevational of the present invention as viewed looking north;

FIG. 2 is an enlarged fragmentary section of the solar collectors of FIG. 1;

Referring now to FIG. 1, pole 10 is mounted on base 12. In the preferred embodiment, pole 10 is made of aluminum and is tapered, having an outer diameter of six inches at the top and ten inches at the bottom. The height of pole 10 is approximately thirty-four feet. Those skilled in the art will realize that this corresponds fairly closely to poles used to suspend street lamps, and indeed such poles are ideally suited for this application. Attached to pole 10 is electrical energy transducer 14 and heat transducer 16. In the preferred embodiment, each of these transducers has an outer diameter of approximately sixteen inches.

Figure 3:
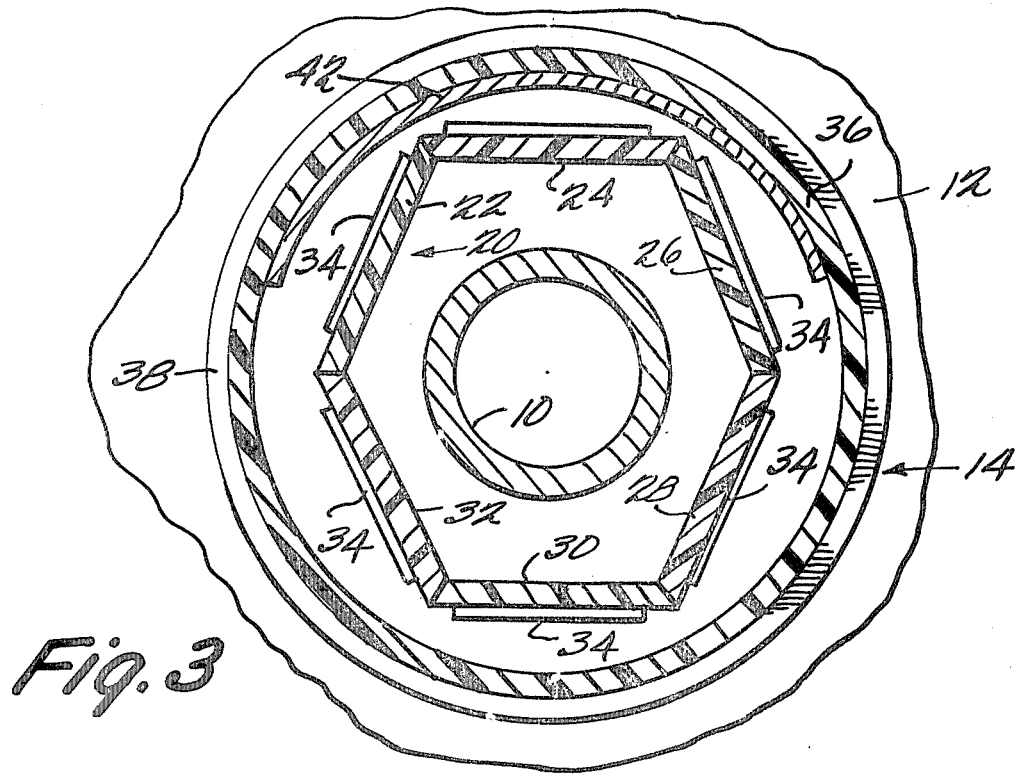
FIG. 3 is a cross-section taken along the III—III line of FIG. 1.

Referring now to FIGS. 2 and 3, electrical transducer 14 is attached to pole 10 by means of brackets 18. Within electrical transducer 14 is a hexagonal structure 20 which extends the length of transducer 14. In the preferred embodiment, hexagonal structure 20 is composed of six interconnected lucite plates having reference numerals 22, 24, 26, 28, 30 and 32. A plurality of solar cells 34 are mounted on each of these plates (ten on each plate, in the preferred embodiment). In the preferred embodiment, each cell 34 is made of silicon and is capable of generating 0.5 volts at 1.2 amps.

Enclosing solar cells 34 is transparent shield 36 which protects solar cells 34 from the environment and eases cleaning. In the preferred embodiment, shield 36 is clear plastic and cylindrical. Capping the ends of electrical transducer 14 are pans 38. Brackets 18 are attached to pans 38 which in turn support both shield 36 and hexagonal structure 20. Vertical lips 40 (see FIG. 2) on pans 38 overlap shield 36 to mechanically position shield 36 and ease the formation of a weather-tight seal between shield 36 and pans 38.

In this country, the sun always remains south of the vertical. Therefore, southerly facing solar cells 34 on plates 28, 30 and 32 receive more direct sunlight than northerly facing solar cells 34 on plates 22, 24 and 26. In order to increase the amount of solar energy incident on the solar cells, reflector 42 is attached to the northern inner surface of shield 36. Reflector 42 reflects energy to northerly facing solar cells 34 on plates 22, 24 and 26 to thereby increase the amount of energy converted into electrical energy. In the preferred embodiment, reflector 42 is made of a highly reflective mica glued to the inner surface of shield 36.

Wires 44 (see FIG. 2) attached to solar cells 34 pass through hole 46 and extend down the central core of pole 10. Thus, pole 10 not only supports electrical energy transducer 14, but also its hollow core provides a convenient serviceway communicating with electrical transducer 14 which protects wires 44 passing therethrough.

Figure 4:
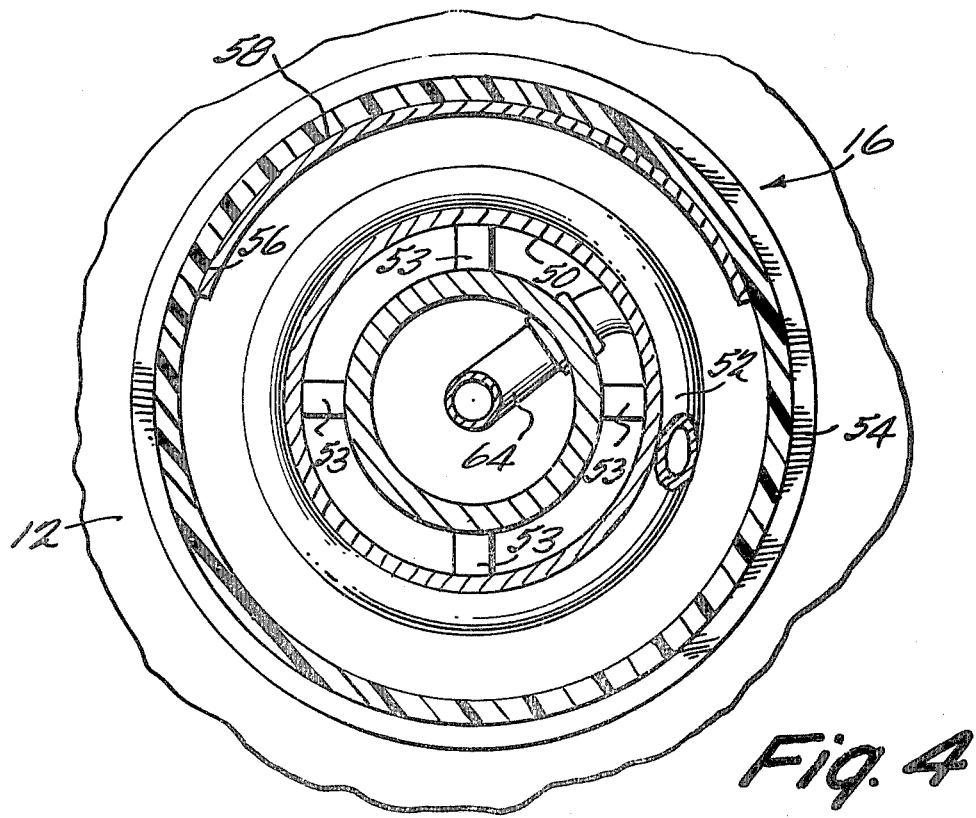
FIG. 4 is a cross-section taken along the IV—IV line of FIG. 1.

Heat transducer 16 is attached to pole 10 by means of brackets 48 (see FIG. 2). As illustrated in FIGS. 2 and 4, tubing 52 is coiled upon support 50 within heat transducer 16. Support 50 and tubing 52 run nearly the entire length of heat transducer 16. Tubing 52 is painted black to maximize heat absorption. It is preferred that tubing 52 be wrapped tightly around support 50. As the wrapping process occurs, tubing 52 tends to flatten, thereby increasing the surface area of the tubing exposed to the sun's rays. Obviously, this is desirable in that it increases the amount of energy that is transferred from the sun's rays to fluid passing through the tubing. In the preferred embodiment, the fluid is water.

Support 50 is held in place radially by spacers 53, and longitudinally by pans 54 which are connected to pole 10 by brackets 48. Pans 54 also support ambient air shield 56 which creates an ambient air space around tubing 52. In the preferred embodiment, ambient air shield 56 is cylindrical in shape and made of a clear plastic such as lucite. Shield 56 helps insulate tubing 52 from the cooler outside environment.

In order to concentrate more solar energy on the coils, reflector 58 is positioned on the inner face of the north side of ambient air shield 56. Reflector 58 reflects solar energy which would otherwise pass through transducer 16 and directs this energy to the portions of tubing 52 on the north side of support 50 which do not primarily receive direct solar energy. In the preferred embodiment, reflector 58 is also made of a highly reflective mica sheet glued to ambient air shield 56.

Tubing 52 passes through pole 10 at holes 60 and 62. Rubber grommets in holes 60 and 62 insulate tubing 52 from pole 10 so that pole 10 does not act as a sink for energy passing through tubing 52. Portion 64 of tubing 52 carries fluid up the center of pole 10, through hole 60 to the coils, while fluid from the coils passes through hole 62, and portion 66 of tubing 52 carries the fluid down the center of pole 10. Thus, again, pole 10 not only supports heat transducer 16, but also its hollow core provides a convenient passageway communicating with the transducer which protects the tubing passing therethrough.

It is also advantageous to include a wind energy to electrical energy transducer at the top of pole 10. Such a transducer may, for example, be comprised of propeller 68 (see FIG. 1) and alternator 70 (see FIG. 6) positioned near propeller 68. Wires 72 from alternator 68 also run down the center of pole 10.

Figure 5:
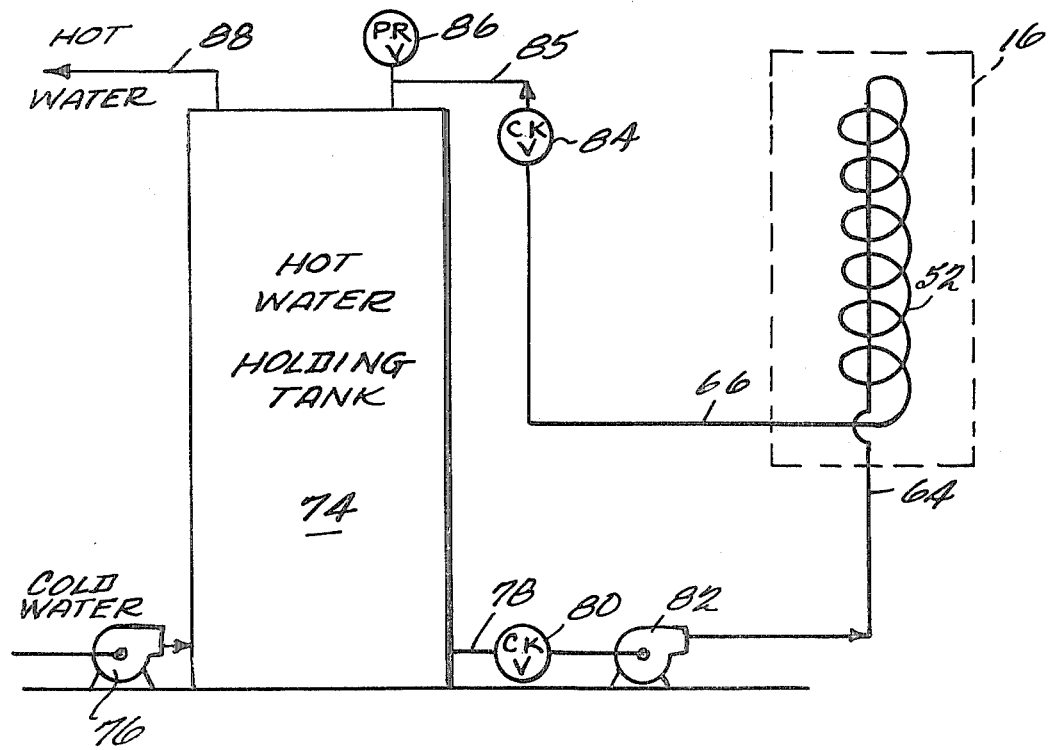
FIG. 5 is a schematic of the plumbing of the present invention.

FIG. 5 is a schematic of the plumbing connected to heat transducer 16. Tank 74 holds water heated by transducer 16. Cold water is supplied to tank 74 via pump 76 which maintains pressure in the system. In the heating process, water leaves the bottom of tank 74 via line 78, and passes through check valve 80 which prohibits the reverse flow of water therethrough. Water then passes through pump 82 which creates circulation through heat transducer 16. After the water has been heated in heat transducer 16, it passes through check valve 84 which also prevents the reverse flow of water, before reentering tank 74 at the top via line 85. Pressure release valve 86 prevents an excessive buildup of pressure due to thermal expansion. Hot water is drawn off the top of tank 74 via line 88 for any desired use. An independently powered water heated may also be added to supplement heat transducer 16.

Figure 6:
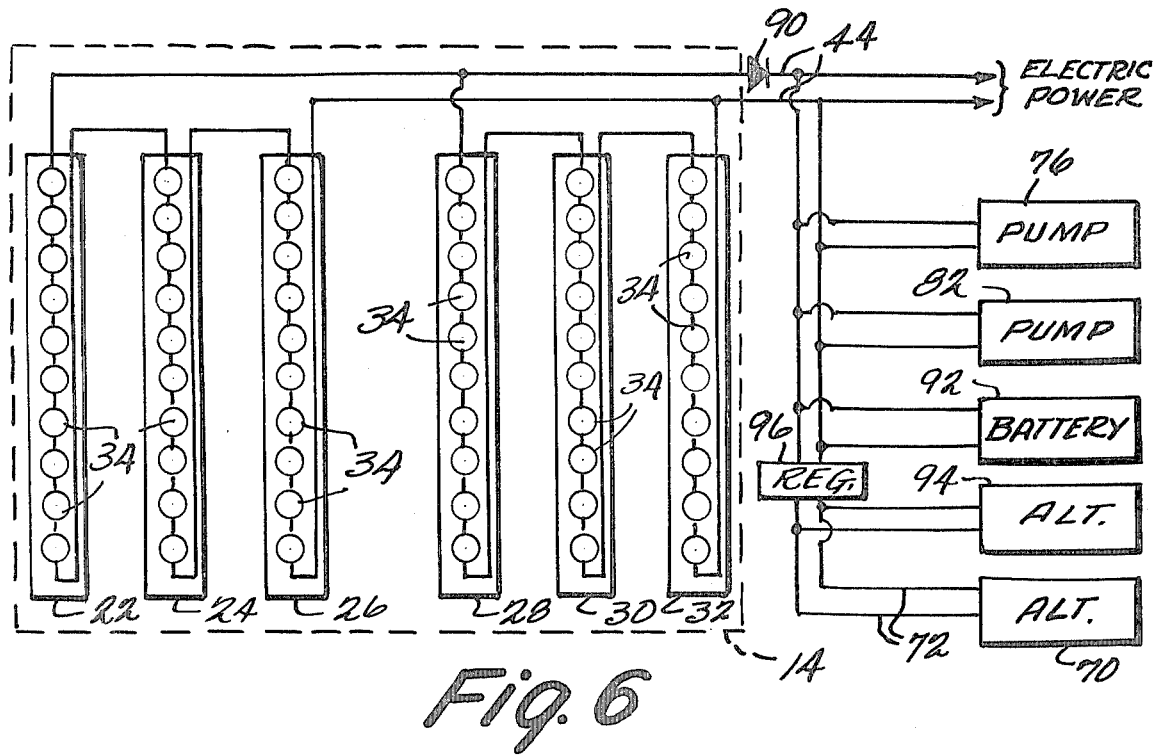
FIG. 6 is a schematic of the electrical circuit of the present invention.

FIG. 6 illustrates the electrical connections to solar cells 34. The solar cells 34 attached to each of sections 22, 24, 26, 28, 30 and 32 of hexagonal structure 20 are connected in series. The three sections 22, 24 and 26 of hexagonal structure 20 facing north are connected in series, and the three sections 28, 30 and 32 of hexagonal structure 20 facing south are connected in series. The cells 34 of the three sections 22, 24 and 26 facing north are then connected in parallel with the cells 34 of the three sections 28, 30 and 32 facing south. Since each cell 34 is capable of producing 0.5 volts at 1.2 amps, each of sections 22, 24, 26, 28, 30 and 32 of hexagonal structure 20 generates five volts at 1.2 amps so that each of the combination of the three northward facing sections 22, 24 and 26 and the combination of the three southward facing sections 28, 30 and 32 generates 15 volts at 1.2 amps. Therefore, the total output of solar cells 34 as connected is 15 volts at 2.4 amps. Diode 90 prevents a reverse flow of current into cells 34. The generated power may be used to drive pumps 76 and 82, in addition to supplying electrical power for any desired use, such as lighting of a house. Excess electrical power may be stored in storage battery 92. If the energy produced by cells 34 is not sufficient to supply all of the electrical needs for the particular end use, battery 92 supplies additional power. If battery 92 discharges, alternator 94 may be connected to the system through voltage regulator 96. Alternator 70 of the wind transducer may also be connected to battery 92 and the system generally through regulator 96. In the preferred embodiment, alternator 70 will trickle charge battery 92 even at night.

Only one exemplary embodiment of this invention has been described in detail above. Those skilled in the art will readily appreciate that many modifications are possible in the exemplary embodiment without materially departing from the novel teachings and advantages of this invention. For example, additional energy transducers, solar, heat, wind or otherwise, may be attached to pole 10. In addition, the pole may be hinged at the bottom so that it may be easily lowered for maintenance and cleaning. Furthermore, cold water may enter the plumbing system in line 78. Hot water may be drawn out of the system from line 85.

Accordingly, all such modifications are intended to be included within the scope of this invention as defined in the following claims.

What is claimed is:

1. A solar energy collector comprising:
   a pole adapted to be vertically disposed;
   a solar energy to heat transducer mounted on said pole;
   a solar energy to electrical energy transducer mounted on said pole;
   means for conducting heat generated by said heat transducer from said heat transducer; and
   means for conducting the electrical energy generated by said electrical energy transducer from said electrical energy transducer.

2. A solar energy collector comprising:
   a pole adapted to be vertically disposed;
   a solar energy to heat transducer mounted on said pole;
   a solar energy to electrical energy transducer mounted on said pole above said heat transducer;
   means for conducting heat generated by said heat transducer from said heat transducer; and
   means for conducting the electrical energy generated by said electrical energy transducer from said electrical energy transducer.

3. A solar energy collector comprising:
   a pole adapted to be vertically disposed;
   a solar energy to heat transducer mounted on said pole, said heat transducer including tubing helically disposed about said pole, a transparent shield disposed about and enclosing said tubing, and reflecting means for reflecting sunlight to the portion of said tubing not directly illuminated by the direct rays of the sun;
   a solar energy to electrical energy transducer mounted on said pole;
   means for conducting heat generated by said heat transducer from said heat transducer; and
   means for conducting the electrical energy generated by said electrical energy transducer from said electrical energy transducer.

4. A solar energy collector as in claim 2 or 3 wherein said electrical energy transducer comprises:
   a plurality of solar cells disposed about said pole, said solar cells being organized in first and second banks, the solar cells of said first bank primarily being adapted for receiving the direct rays of the sun, the solar cells of said second bank primarily not being adapted for receiving the direct rays of the sun; and
   means for reflecting sunlight to said second bank.

5. A solar energy collector as in claim 4 wherein said first bank and second bank are electrically connected in parallel.

6. A solar energy collector as in claim 1, 2 or 3 wherein:
   said heat conducting means comprises a first conduit for conducting a fluid to said heat transducer and a second conduit for conducting said fluid from said heat transducer; and
   said apparatus further comprises:
   heat storing means adapted to be at least partially filled with said fluid;
   means for controlling the entry of unheated fluid into said heat storing means;
   a third conduit connecting said heat storing means to said first conduit for conducting fluid from said heat storing means to said first conduit;
   a fourth conduit connecting said heat storing means to said second conduit for conducting fluid from said second conduit to said heat storing means;
   a first check valve disposed in said third conduit;
   a second check valve disposed in said fourth conduit;
   pumping means for circulating fluid from said heat storing means through said third conduit, first conduit, said heat transducer, said second conduit and said fourth conduit to said heat storing means; and
   means for conducting heated fluid from said heat storing means.

7. A solar energy collector as in claim 1, further comprising a wind energy to electrical energy transducer mounted on said pole.

8. A solar energy collector comprising:
   a pole adapted to be vertically disposed;
   a solar energy to heat transducer mounted on said pole;
   a solar energy to electrical energy transducer mounted on said pole comprising a plurality of solar cells disposed about said pole, said means for reflecting sunlight to those of said solar cells not primarily adapted to be directly illuminated by the rays of the sun;
   means for conducting heat generated by said heat transducer from said heat transducer; and means for conducting the electrical energy generated by said electrical energy transducer from said electrical energy transducer.

9. A solar energy collector as in claim 3 or 8 wherein said electrical energy transducer is disposed on said pole above said heat transducer.

10. A solar energy collector as in claims 2 or 8 wherein said solar energy to heat transducer comprises:
tubing helically disposed about said pole;
a transparent shield disposed about and enclosing said tubing; and
means for reflecting sunlight to the portion of said tubing not directly illuminated by the rays of the sun.

11. A solar energy collector comprising:
a pole adapted to be vertically disposed;
a solar energy to heat transducer mounted on said pole, said heat transducer comprising tubing helically disposed about said pole, a transparent shield disposed about and enclosing said tubing, and means for reflecting sunlight to the portion of said tubing not directly illuminated by the rays of the sun;
a solar energy to electrical energy transducer mounted on said pole above said heat transducer;
means for conducting heat generated by said heat transducer from said heat transducer; and
means for conducting the electrical energy generated by said electrical energy transducer from said heat transducer.

12. A solar energy collector comprising:
a pole adapted to be vertically disposed;
a solar energy to heat transducer mounted on said pole;
a solar energy to electrical energy transducer mounted on said pole above said heat transducer, said electrical energy transducer including a plurality of solar cells disposed about said pole and means for reflecting the rays of the sun to the portion of said plurality of solar cells not directly illuminated by the rays of the sun;
means for conducting heat generated by said heat transducer from said heat transducer; and
means for conducting the electrical energy generated by said electrical energy transducer from said electrical energy transducer.

13. A solar energy collector comprising:
a pole adapted to be vertically disposed;
a solar energy to heat transducer mounted on said pole including:
tubing helically disposed about said pole,
a transparent shield disposed about and enclosing said tubing, and
means for reflecting sunlight to the portion of said tubing not directly illuminated by the rays of the sun;
a solar energy to electrical energy transducer mounted on said pole including:
a plurality of solar cells disposed about said pole, above said tubing, and
means for reflecting sunlight to the portion of said plurality of solar cells not directly illuminated by the rays of the sun;
means for storing heat adapted to be at least partially filled with a fluid;
first conducting means for conducting fluid from said heat storing means to one end of said tubing;
second conducting means for conducting fluid from the second end of said tubing to said heat storing means;
means for controlling the entry of unheated fluid to at least one of said heat storing means and said first conducting means;
pumping means for circulating fluid from said heat storing means, through said first conducting means, said tubing, said second conducting means, to said heat storing means;
means for conducting heated fluid from at least one of said heat storing means and second conducting means;
a battery;
means for electrically connecting said plurality of solar cells to said battery; and
means for conducting electrical energy from at least one of said battery, said electrical connecting means, and said solar cells.

* * * * *